H. A. ROEMER.
FRICTION GEAR.
APPLICATION FILED FEB. 7, 1921.

1,387,909.

Patented Aug. 16, 1921.

Inventor
H. A. Roemer.

By Frease, Merkel, Saywell
Attorneys

UNITED STATES PATENT OFFICE.

HENRY A. ROEMER, OF CANTON, OHIO.

FRICTION-GEAR.

1,387,909.   Specification of Letters Patent.   Patented Aug. 16, 1921.

Original application filed April 16, 1920, Serial No. 374,284. Divided and this application filed February 7, 1921. Serial No. 443,111.

*To all whom it may concern:*

Be it known that I, HENRY A. ROEMER, a citizen of the United States, residing at Canton, in the county of Stark and State of Ohio, have invented a new and useful Friction-Gear, of which the following is a specification.

This invention relates to friction gears and more particularly to a friction gear adapted for use upon the neck or shaft of a roll or similar element and is a division of my pending application Serial Number 374,284, for Improvement in Rolling Mills, filed April 16, 1920.

The objects of the invention are the provision of a friction gear upon the neck or shaft of a roll or the like, said friction gear being under sufficient tension to normally rotate the roll but being arranged to disengage from the roll when the same is suddenly stopped.

The above and ancillary objects are attained by providing a conical or tapered portion upon the neck or shaft of the roll and mounting an internally coned gear-ring upon said conical or tapered portion, pins being fixed in the outer end of the conical or tapered portion of the roll, a disk or plate being slidably mounted upon said pins and held in engagement with the gear-ring by means of springs mounted upon the pins, the gear-ring being thus frictionally mounted upon the roll.

Figure 2:
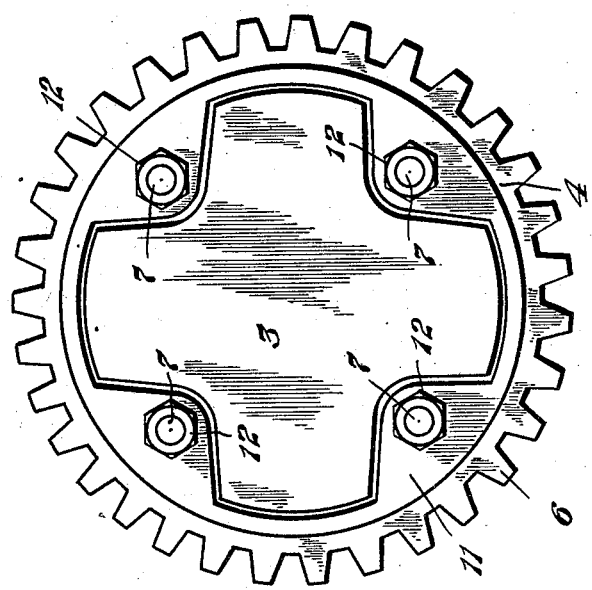
Figure 1:
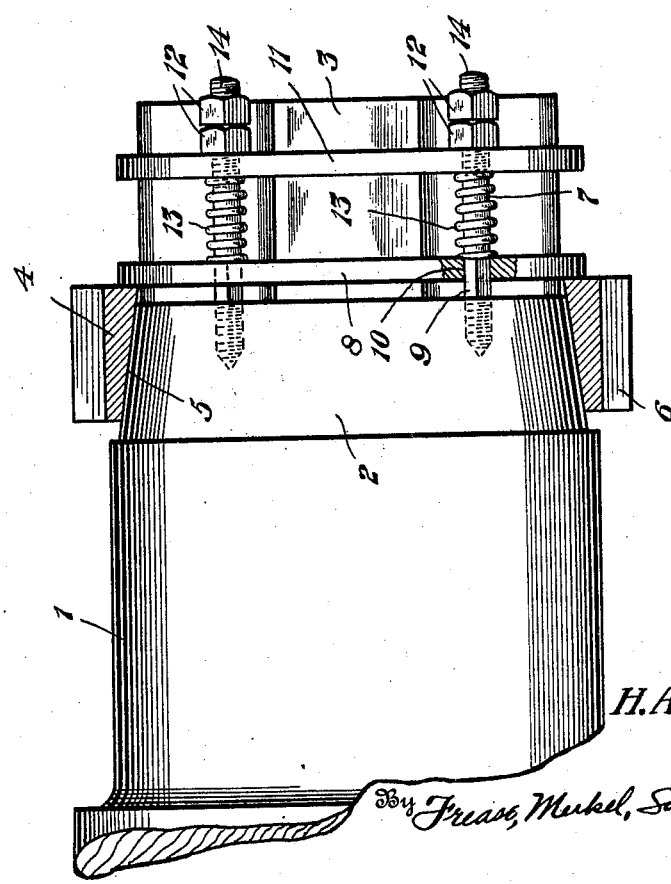

The invention thus set forth in general terms is illustrated in the accompanying drawings, forming part hereof, in which:

Figure 1 is a fragmentary side elevation, partly in section of an end portion of a roll showing the friction gear embodying the invention applied thereto, and Fig. 2 is an end view thereof.

A practical embodiment of the invention is disclosed in the accompanying drawings, forming a part of this specification, in which similar numerals of reference indicate corresponding parts throughout the several views.

The device is adaptable for use in various devices where it is desirable to provide a gear frictionally mounted upon a shaft or the like and arranged to be released from the shaft under a predetermined strain, but is especially designed for use in a rolling mill where the upper roll is positively driven from the lower roll, it being, of course, necessary in such cases to provide some means by which the upper roll may be released momentarily from the drive mechanism in the event that said upper roll is suddenly stopped, this being common in the operation of rolling mills.

In the accompanying drawings the device is shown applied to the shaft of a roll which is indicated by the numeral 1, a conical portion 2 being provided upon the shaft, terminating in the usual wabbler 3.

The gear comprises a ring 4 being internally coned, as shown at 5, to receive the conical portion 2 of the shaft, teeth 6 being provided around the periphery of said ring. Pins 7 are fixed in the outer extremity of the conical portion 2 of the shaft and extend outwardly to the end of the wabbler 3, a disk 8 provided with a central opening shaped to receive the wabbler 3, being slidably mounted upon said pins and engaging the gear ring 4.

The pins 7 are provided with squared portions 9 which are received in squared apertures 10 in the disk 8, thus preventing accidental loosening of the pins, due to the jarring of the mill.

A disk 11 similar to the disk 8, is slidably mounted upon the end portion of the wabbler and upon the pins 7, and nuts 12 are provided upon the extremities of the pins, coil springs 13 being interposed between the disks 8 and 11 to normally urge the disk 8 inwardly against the gear-ring 4, holding the same in frictional engagement with the coned portion 2 of the shaft. Any desired tension may be placed upon the gear-ring by adjusting the nuts 12 upon the threaded outer end portions 14 of the pins 7, moving the disk 8 toward or from the tapered portion 2 of the roll, thus providing for compression or expansion of the springs 13 as desired, and allowing the gear-ring to slip upon the tapered portion of the neck of the roll at the proper time to prevent injury to the rolls and gearing. It will, of course, be understood that the frictionally mounted gear-ring meshes with suitable gearing to drive the roll.

With the construction of gearing illustrated and above described, it will be seen that there will be no danger of serious injury to the roll or to the gearing in the event that the roll is suddenly stopped, as the frictionally mounted gear-ring 4 will be permitted to rotate upon the conical or tapered portion of the roll independently of the roll.

I claim:—

1. In combination with a shaft having a conical portion, an internally coned gear-ring mounted upon the conical portion of the shaft, pins mounted in the outer end of the conical portion of the shaft, a plate slidably mounted upon said pins, a second plate spaced from the first plate and mounted upon said pins, and springs upon said pins interposed between said plates for normally holding the first named plate in contact with the gear-ring.

2. In combination with a shaft having a conical portion, an internally coned gear-ring mounted upon the conical portion of the shaft, pins mounted in the outer end of the conical portion of the shaft, a plate slidably mounted upon said pins, a second plate spaced from the first plate and mounted upon said pins and means for adjusting the second named plate longitudinally upon said pins, and springs upon said pins interposed between said plates for normally holding the first named plate in contact with the gear-ring.

3. In combination with a shaft having a conical portion, an internally coned gear-ring mounted upon the conical portion of the shaft, pins mounted in the outer end of said conical portion, a squared portion upon each pin, a plate slidably mounted upon said pins and provided with squared apertures receiving the squared portions of the pins and springs upon said pins engaging the plate for normally holding the same in contact with the gear-ring.

4. In combination with a shaft having a conical portion, an internally coned gear-ring mounted upon the conical portion of the shaft, pins mounted in the outer end of said conical portion, a plate slidably mounted upon said pins, a second plate provided with squared apertures slidably mounted upon the squared portions of the pins, and springs interposed between said plates for normally holding the second named plate in contact with the gear-ring.

5. In combination with a shaft having a conical portion, an internally coned gear-ring mounted upon the conical portion of the shaft, pins mounted in the outer end of said conical portion, a plate slidably mounted upon said pins, a second plate provided with squared apertures slidably mounted upon the squared portions of the pins, and springs interposed between said plates for normally holding the second named plate in contact with the gear-ring, and means for adjusting the first named plate longitudinally upon the pins.

6. In combination with a shaft having a conical portion, an internally coned gear-ring mounted upon the conical portion of the shaft, pins mounted in the outer end of said conical portion, a squared portion upon each pin, a plate slidably mounted upon said pins and provided with squared apertures receiving the squared portions of the pins, springs upon said pins engaging the plate for normally holding the same in contact with the gear-ring, and means for adjusting the tension of the springs.

7. In combination with a shaft having an enlarged portion, a gear-ring mounted upon the shaft and frictionally engaging the enlarged portion, pins mounted in the enlarged portion of the shaft, a plate slidably mounted upon said pins, a second plate spaced from the first plate and mounted upon said pins, means for adjusting the second named plate longitudinally upon the pins and springs interposed between said plate for normally holding the first named plate in contact with the gear-ring.

8. In combination with a shaft having an enlarged portion, a gear-ring mounted upon the shaft and frictionally engaging the enlarged portion thereof, pins mounted in the enlarged portion of the shaft, a plate slidably mounted upon said pins, a second plate spaced from the first plate and mounted upon said pins and springs upon said pins interposed between said plates for normally holding the first named plate in contact with the gear-ring.

In testimony that I claim the above, I have hereunto subscribed my name.

HENRY A. ROEMER.